(12) United States Patent
Okuzono

(10) Patent No.: US 11,201,980 B2
(45) Date of Patent: Dec. 14, 2021

(54) IMAGE FORMING APPARATUS WITH POWER CONTROL BASED ON HUMAN DETECTION, METHOD FOR CONTROLLING IMAGE FORMING APPARATUS, AND RECORDING MEDIUM

(71) Applicant: CANON KABUSHIKI KAISHA, Tokyo (JP)

(72) Inventor: Ryotaro Okuzono, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/931,167

(22) Filed: Jul. 16, 2020

(65) Prior Publication Data

US 2020/0351415 A1   Nov. 5, 2020

Related U.S. Application Data

(63) Continuation of application No. 15/659,516, filed on Jul. 25, 2017, now abandoned, which is a continuation of application No. 14/621,232, filed on Feb. 12, 2015, now Pat. No. 9,749,490.

(51) Int. Cl.
*G06F 3/12* (2006.01)
*H04N 1/00* (2006.01)
*G06K 15/00* (2006.01)

(52) U.S. Cl.
CPC ....... *H04N 1/00896* (2013.01); *G06K 15/406* (2013.01)

(58) Field of Classification Search
None
See application file for complete search history.

(56) References Cited

U.S. PATENT DOCUMENTS

| 8,924,759 B2* | 12/2014 | Miki | H04N 1/00896 713/323 |
| 9,148,542 B2* | 9/2015 | Imamura | H04N 1/00896 |
| 9,288,354 B2* | 3/2016 | Hirose | H04N 1/00323 |
| 2006/0029412 A1* | 2/2006 | Kato | G03G 15/5016 399/80 |
| 2006/0250745 A1* | 11/2006 | Butler | H05B 47/16 361/160 |
| 2010/0014110 A1* | 1/2010 | Munetomo | H04N 1/342 358/1.14 |
| 2012/0127537 A1* | 5/2012 | Takeuchi | H04N 1/00904 358/442 |

(Continued)

FOREIGN PATENT DOCUMENTS

| JP | 2003-259043 A | 9/2003 |
| JP | 2011-133515 A | 7/2011 |

(Continued)

*Primary Examiner* — Dung D Tran
(74) *Attorney, Agent, or Firm* — Canon U.S.A., Inc. IP Division

(57) ABSTRACT

An image forming apparatus capable of switching power state between a first power state and a second power state, which is lower in power than the first power state, shifts from the second power state to the first power state. In a case where the image forming apparatus shifts to the second power state in response to a current time reaching a set time, the image forming apparatus is controlled not to shift from the second power state to the first power state in response to an object approaching the image forming apparatus being detected.

16 Claims, 17 Drawing Sheets

(56) References Cited

U.S. PATENT DOCUMENTS

| | | | | |
|---|---|---|---|---|
| 2012/0141155 A1* | 6/2012 | Suzumi | G03G 15/5004 | 399/70 |
| 2012/0327447 A1* | 12/2012 | Funakawa | G06K 15/005 | 358/1.13 |
| 2013/0057894 A1* | 3/2013 | Narushima | G03G 15/5004 | 358/1.14 |
| 2013/0073887 A1* | 3/2013 | Miki | G06F 1/3287 | 713/323 |
| 2013/0083344 A1* | 4/2013 | Funakawa | H04N 1/00896 | 358/1.13 |
| 2013/0135659 A1* | 5/2013 | Ebi | G06K 15/4055 | 358/1.14 |
| 2014/0063528 A1* | 3/2014 | Hirose | H04N 1/32657 | 358/1.13 |
| 2014/0092417 A1* | 4/2014 | Kuroishi | H04N 1/00342 | 358/1.14 |
| 2014/0098394 A1* | 4/2014 | Tanisaki | G01J 5/025 | 358/1.13 |
| 2014/0147157 A1* | 5/2014 | Hiraguchi | G03G 15/5004 | 399/88 |
| 2014/0153013 A1* | 6/2014 | Imamura | G03G 15/5004 | 358/1.12 |
| 2014/0153020 A1* | 6/2014 | Tachikawa | G06K 15/4055 | 358/1.13 |
| 2014/0160505 A1* | 6/2014 | Tachikawa | H04N 1/00323 | 358/1.13 |
| 2014/0176977 A1* | 6/2014 | Morita | H04N 1/00323 | 358/1.13 |
| 2014/0183946 A1* | 7/2014 | Recker | H02J 9/061 | 307/23 |
| 2014/0300917 A1* | 10/2014 | Ito | G06F 3/1221 | 358/1.14 |
| 2014/0355052 A1* | 12/2014 | Mikashima | H04N 1/00896 | 358/1.15 |
| 2014/0376941 A1* | 12/2014 | Okuzono | G03G 15/5091 | 399/75 |
| 2015/0002877 A1* | 1/2015 | Ono | G06F 1/3231 | 358/1.14 |
| 2015/0043024 A1* | 2/2015 | Hiramatsu | H04N 1/00891 | 358/1.14 |

FOREIGN PATENT DOCUMENTS

| | | |
|---|---|---|
| JP | 2013-103423 A | 5/2013 |
| JP | 2013-230688 A | 11/2013 |
| JP | 2014-002216 A | 1/2014 |

* cited by examiner

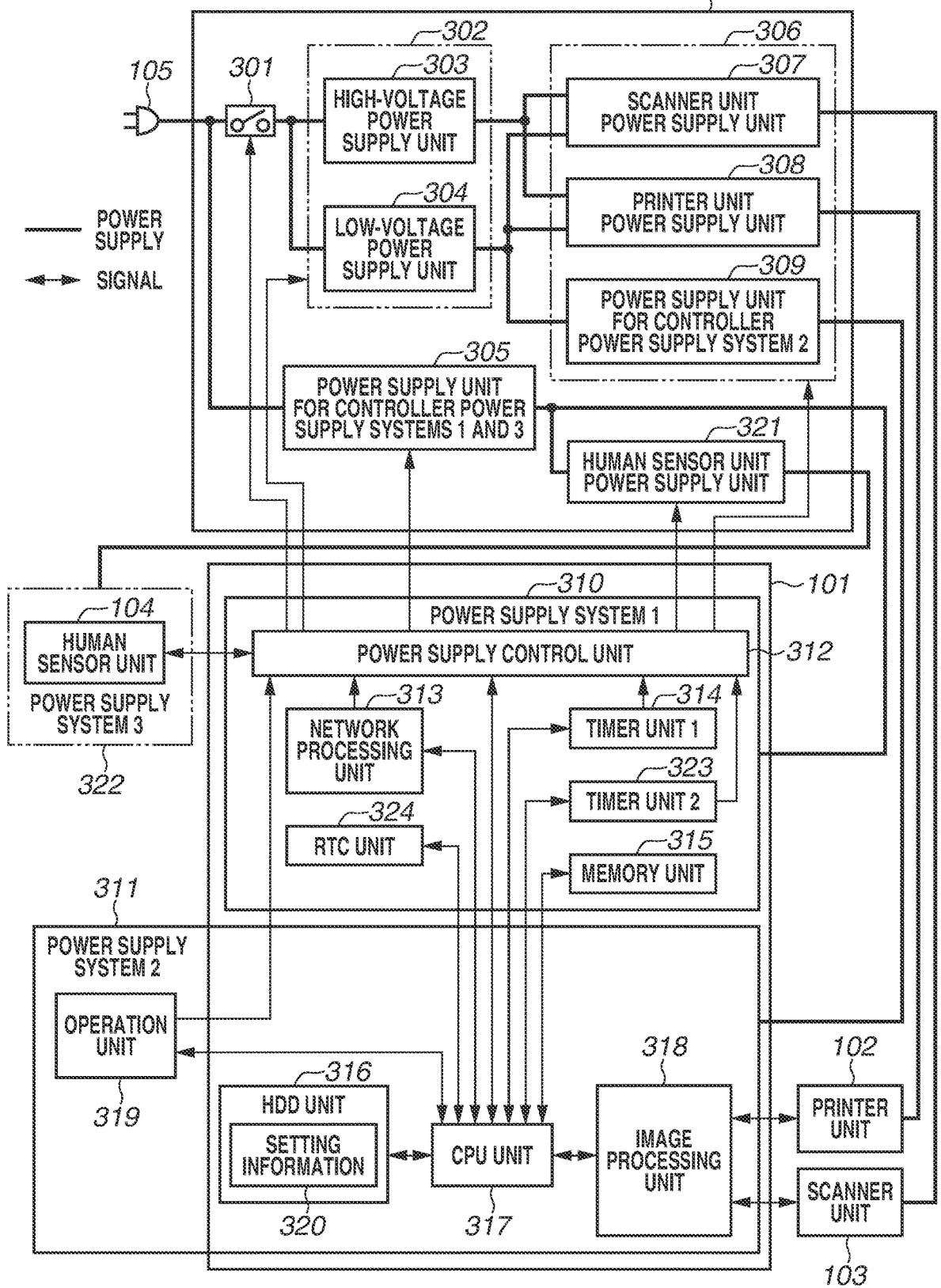

IMAGE FORMING APPARATUS WITH POWER CONTROL BASED ON HUMAN DETECTION, METHOD FOR CONTROLLING IMAGE FORMING APPARATUS, AND RECORDING MEDIUM

CROSS-REFERENCE TO RELATED APPLICATION

This application is a Continuation of U.S. application Ser. No. 15/659,516, filed Jul. 25, 2017; which is a Continuation of U.S. application Ser. No. 14/621,232, filed Feb. 12, 2015, now a U.S. Pat. No. 9,749,490, issued on Aug. 29, 2017; which claims priority from Japanese Patent Application No. 2014-028393 filed Feb. 18, 2014, which are hereby incorporated by reference herein in their entireties.

BACKGROUND OF THE INVENTION

Field of the Invention

One disclosed aspect of the embodiments relates to an image forming apparatus, a method for controlling the image forming apparatus, and a recording medium.

Description of the Related Art

Conventionally, in an image forming apparatus such as a printer, a facsimile apparatus, or a copying machine, predetermined power generated by a power supply device is supplied to a predetermined load of the image forming apparatus. The image forming apparatus includes a power supply control device. If the image forming apparatus does not operate for a certain time period, the power supply control device shifts the image forming apparatus from a normal mode where a user can operate the image forming apparatus to a power saving mode (a sleep mode) for reducing power consumption. However, even if the operation by the user has ended, it is necessary to maintain the normal mode for a certain time period until the image forming apparatus shifts to the sleep mode. This may lead to consuming unnecessary power.

To solve this problem, the following apparatus is discussed. Human body detection units are provided in an image forming apparatus. If the human body detection units detect that a user has moved away, the image forming apparatus shifts to a sleep mode. If the human body detection units detect that a user has approached the image forming apparatus, the image forming apparatus shifts to a normal mode (see Japanese Patent Application Laid-Open No. 2012-256234).

Further, there is also an apparatus for determining a power saving mode to which the apparatus is to shift, according to information of various sensors and start history information (see Japanese Patent Application Laid-Open No. 2009-15770).

In the technique discussed in Japanese Patent Application Laid-Open No. 2012-256234, two human body detection units are used to determine whether a person is a user of the image forming apparatus or a passerby. If, however, a person has stopped in front of the image forming apparatus, the human body detection units may erroneously determine that the person is a user. That is, even though a user intentionally sets the shift to the sleep mode, which is a power saving state, and shifts the image forming apparatus to the sleep mode, if a user who does not intend to use the image forming apparatus merely approaches the image forming apparatus, the image forming apparatus shifts to the normal mode. This may lead to consuming unnecessary power.

Further, in the technique discussed in Japanese Patent Application Laid-Open No. 2009-15770, the power saving state is determined according to the states of the various sensors and the start history information. Thus, a user cannot intentionally specify a power state where the power consumption is small. This may lead to consuming unnecessary power.

SUMMARY OF THE INVENTION

One disclosed aspect of the embodiments is directed to a technique for stopping power supply to a power supply system for detecting an object, for a predetermined time period during which an apparatus is in a power saving state.

According to an aspect of the embodiments, an image forming apparatus capable of switching power state between a first power state and a second power state, which is lower in power than the first power state, includes a first setting unit configured to set a time at which the image forming apparatus shifts from the first power state to the second power state, a detection unit configured to detect an object approaching the image forming apparatus, a shift unit configured to, in a case where the detection unit detects an object approaching the image forming apparatus in the second power state, shift the image forming apparatus from the second power state to the first power state, and a control unit configured to, in a case where the image forming apparatus shifts to the second power state in response to a current time reaching the time set by the first setting unit, control the shift unit not to shift the image forming apparatus from the second power state to the first power state in response to the detection unit detecting an object approaching the image forming apparatus.

Further features of the disclosure will become apparent from the following description of exemplary embodiments with reference to the attached drawings.

BRIEF DESCRIPTION OF THE DRAWINGS

FIG. 3 is a block diagram illustrating power supply systems of the image forming apparatus.

DESCRIPTION OF THE EMBODIMENTS

Various exemplary embodiments, features, and aspects of the disclosure will be described in detail below with reference to the drawings.

<Description of System Configuration>

Figure 1:
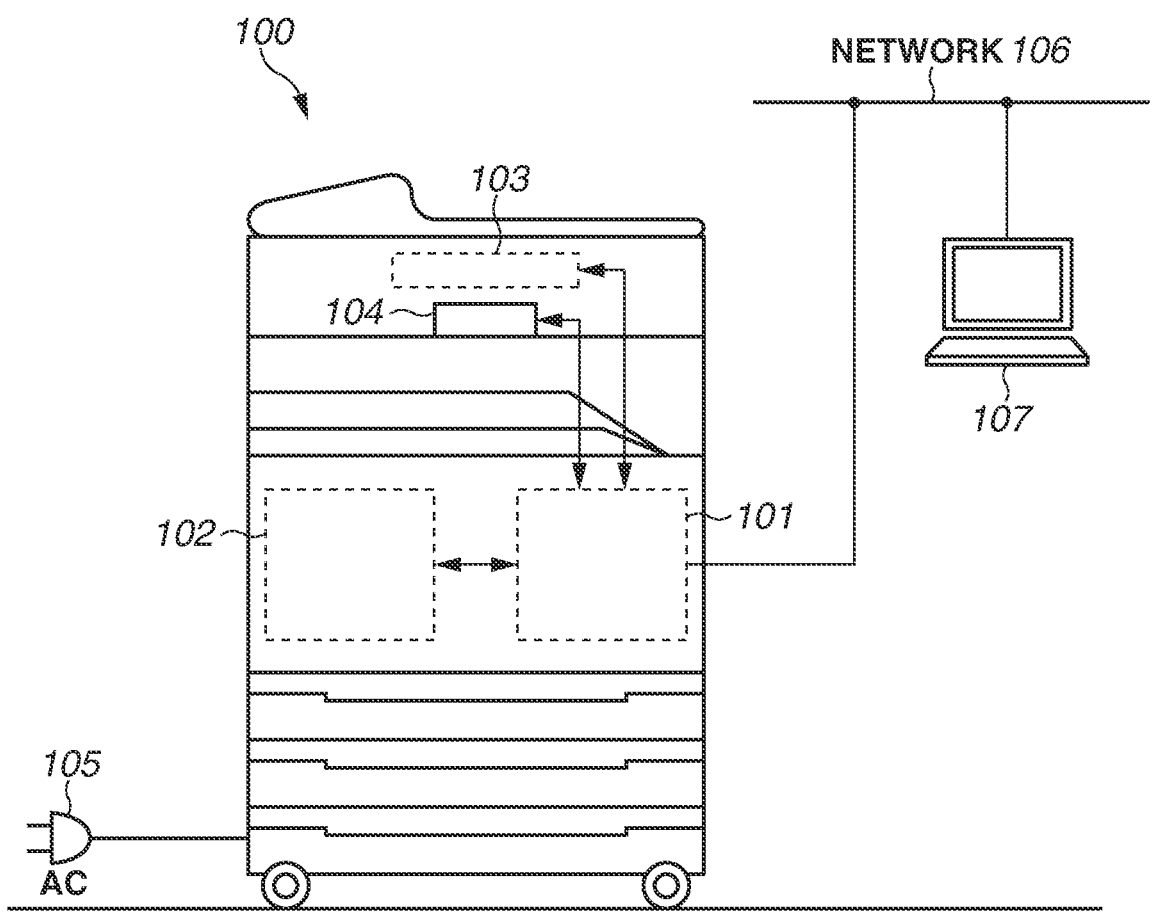
FIG. 1 schematically illustrates an image forming system.

FIG. 1 schematically illustrates an image forming system including an image forming apparatus according to a first exemplary embodiment.

In FIG. 1, an image forming apparatus 100 includes a printer unit 102, a scanner unit 103, and a main controller unit 101. The printer unit 102 performs an image forming process on a sheet-like recording medium (a sheet) according to an electrophotographic method, for example. The scanner unit 103 optically reads an image from a document and coverts the read image into a digital image. The main controller unit 101 controls the entire image forming apparatus 100 so as to perform control operations of causing the printer unit 102 to perform an image forming process of a document image read by the scanner unit 103 and performing a copy operation.

Further, the main controller unit 101 is connected to a personal computer (PC) 107 via a network 106. The network 106 is a local area network (LAN) or the like, and it does not matter whether the network 106 is wired or wireless. The PC 107 is a general computer apparatus which includes a central processing unit (CPU), a random-access memory (RAM), and a fixed storage device such as a hard disk drive (HDD), and to which a monitor, a keyboard, and a mouse are connected. In the PC 107, a printer driver program as an image forming program is installed.

If the printer driver program is executed by the PC 107, the PC 107 generates page description language (PDL) data according to a rendering command issued by an operating system or an application program, and transmits the generated PDL data to the image forming apparatus 100.

The PDL data is data converted by the printer driver program into page description language that can be processed by the image forming apparatus 100. The image forming apparatus 100 forms on a sheet a bitmap image generated based on the PDL data received from the PC 107, thereby performing a printing operation. The image forming apparatus 100 includes an alternating current (AC) plug 105. The AC plug 105 is inserted into an outlet outside the apparatus, thereby allowing the image forming apparatus 100 to receive power supply from an alternating current commercial power source.

Further, the image forming apparatus 100 includes a human sensor unit 104 for detecting a moving object such as a person around the image forming apparatus 100. The human sensor unit 104 is not particularly limited so long as the human sensor unit 104 is a sensor capable of determining the presence or absence of a person within a detection range, such as a pyroelectric sensor for sensing infrared light radiated from a person and determining the presence or absence of a person based on the amount of change in the infrared light, or a reflective sensor for radiating light such as infrared light and detecting the reflected light of the radiated light.

Figure 2A:
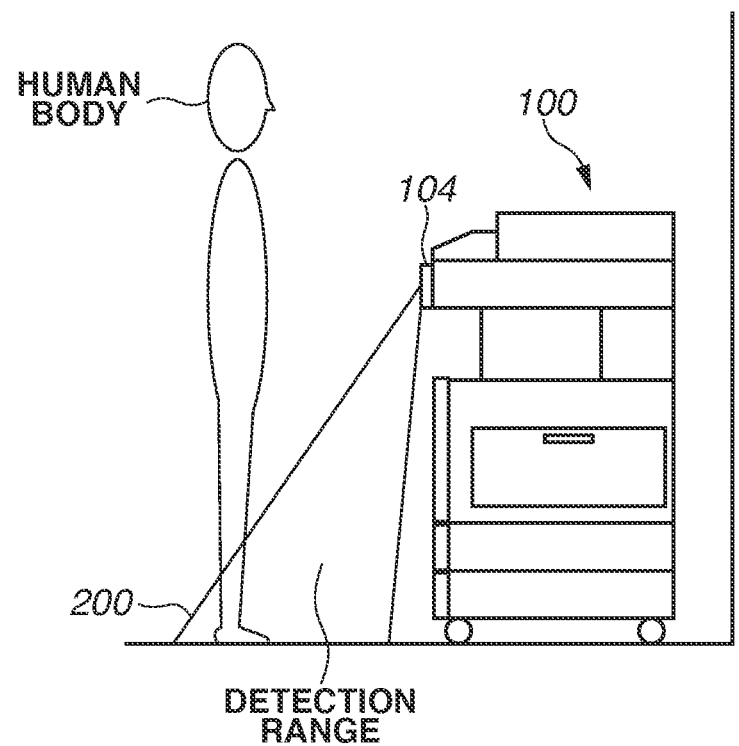
FIGS. 2A and 2B are diagrams illustrating a user detection process performed with respect to an image forming apparatus.
Figure 2B:
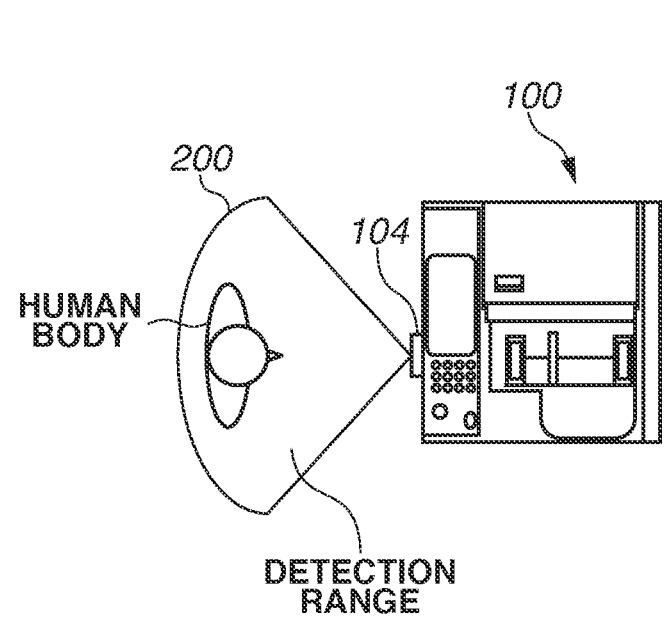

FIGS. 2A and 2B are diagrams illustrating a user detection process performed with respect to the image forming apparatus 100 illustrated in FIG. 1. FIG. 2A corresponds to a side view of an area where the human sensor unit 104 detects a human body having approached the front surface of the image forming apparatus 100. FIG. 2B corresponds to a top view of the area where the human sensor unit 104 detects the human body having approached the front surface of the image forming apparatus 100.

In FIGS. 2A and 2B, a detection range 200 is the detection range of the human sensor unit 104. The human sensor unit 104 detects a person present within the detection range 200.

In FIG. 2A, which is a side view of the image forming apparatus 100, the detection range 200 of the human sensor unit 104 is directed to a lower portion in front of the apparatus, where a user who performs an operation standing in front of the image forming apparatus 100 is predicted to be present.

Further, in FIG. 2B, which is a top view of the image forming apparatus 100, the human sensor unit 104 is attached to the front surface of an operation unit, where a user is predicted to operate the operation unit standing in front of the image forming apparatus 100. The detection range 200 can be changed depending on the attachment position of the human sensor unit 104, the orientation of the attached human sensor unit 104, and the like.

FIG. 3 is a block diagram illustrating the configuration of the image forming apparatus 100 according to the present exemplary embodiment. In this example, the configurations of the main controller unit 101 and a power supply device unit of the image forming apparatus 100 will be described.

In FIG. 3, the main controller unit 101 includes a power supply control unit 312, a network processing unit 313, a timer unit 314 (a timer unit 1), a timer unit 323 (a timer unit 2), a memory unit 315, a real-time clock (RTC) unit 324, an HDD unit 316, which functions as an external storage unit, a CPU unit 317, and an image processing unit 318. The power supply control unit 312 performs switching control for supplying or disconnecting power to the components of the image forming apparatus 100, according to a program executed by the CPU unit 317 and the states of the human sensor unit 104, an operation unit 319, the network processing unit 313, and the timer units 314 and 323.

The network processing unit 313 is connected to the CPU unit 317 and the power supply control unit 312. The network processing unit 313 is a control unit for outputting, to the CPU unit 317, PDL data transmitted from the PC 107 via the network 106. Further, when the image forming apparatus 100 is in a sleep mode state, and if the network processing unit 313 receives from the network 106 a network packet addressed to the image forming apparatus 100, the network processing unit 313 instructs the power supply control unit 312 to shift to a normal mode.

The human sensor unit 104 is connected to the power supply control unit 312 and notifies the power supply control unit 312 of the presence or absence of a person within the detection range 200 of the human sensor unit 104. Further, when the image forming apparatus 100 is in the sleep mode state (a normal sleep mode) where power is supplied to the human sensor unit 104, and if the human sensor unit 104 detects the presence of a person within the detection range 200 of the human sensor unit 104, the human sensor unit 104 instructs the power supply control unit 312 to shift to the normal mode.

When the image forming apparatus 100 is in a sleep mode state (a human sensor power disconnection sleep mode) where power to the human sensor unit 104 is disconnected, the human sensor unit 104 does not detect a person. Thus, the image forming apparatus 100 does not shift to the normal mode based on the detection of a person. The timer units 314 and 323 are connected to the CPU unit 317 and the power supply control unit 312. The CPU unit 317 sets a timer time in each of the timer units 314 and 323, whereby the timer unit measures the set time and after the lapse of the set timer time, notifies the power supply control unit 312 of the lapse of the set timer time.

The memory unit 315 is connected to the CPU unit 317. The memory unit 315 is a volatile memory such as a double data rate synchronous dynamic random-access memory (DDR SDRAM), and is a main memory for storing user data created by a control program executed by the CPU unit 317. The HDD unit 316 is connected to the CPU unit 317. The HDD unit 316 is a storage device for temporarily storing a program executed by the CPU unit 317 and PDL data transmitted from the network 106. Further, the HDD unit 316 stores setting information 320 of the image forming apparatus 100. The RTC unit 324 is a real-time clock for measuring the current time and is used for confirming the current time by the CPU unit 317 connected to the RTC unit 324.

The CPU unit 317 is a central processing unit for controlling the entire image forming apparatus 100, and realizes a copy function and a print function based on a control program stored in the HDD unit 316. The image processing unit 318 is connected to the CPU unit 317, the printer unit 102, and the scanner unit 103. The image processing unit 318 performs image processing such as color space conversion on a digital image output from the scanner unit 103, and outputs the image-processed data to the CPU unit 317. Further, the image processing unit 318 performs image processing such as color space conversion on image data read by the scanner unit 103 or image data generated based on PDL data received from the PC 107, converts the image data into bitmap data, and outputs the bitmap data to the printer unit 102. The operation unit 319 is connected to the power supply control unit 312 and the CPU unit 317.

The operation unit 319 includes an operation liquid crystal panel and hardware keys including a sleep mode shift/cancellation button, and receives an instruction input from a user. Further, if the operation unit 319 detects the pressing of the sleep mode shift/cancellation button while the image forming apparatus 100 is in a sleep mode, the operation unit 319 instructs the power supply control unit 312 to shift to the normal mode.

Next, with reference to FIG. 3, a power supply device 300 of the image forming apparatus 100 will be described.

The AC plug 105 included in the image forming apparatus 100 is inserted into an outlet outside the apparatus, thereby supplying alternating current commercial power to a relay 301 and a power supply unit 305 for controller power supply systems 1 and 3.

The relay 301 is controlled by the power supply control unit 312. The relay 301 is turned on, thereby enabling the supply of power to a high-voltage power supply unit 303 and a low-voltage power supply unit 304. The power supply unit 305 for the controller power supply systems 1 and 3 is controlled by the power supply control unit 312 and connected to a power supply system 310 (a power supply system 1) of the main controller unit 101 and a human sensor unit power supply unit 321.

The power supply system 310 is a power supply system to which power is always supplied even in a sleep mode, and the power supply control unit 312, the network processing unit 313, the timer unit 314, the timer unit 323, the RTC unit 324, and the memory unit 315 are connected to the power supply system 310. Further, the human sensor unit power supply unit 321 is connected to the human sensor unit 104 with the power supply unit 305 for the controller power supply systems 1 and 3 being an input source. The on/off state of the human sensor unit power supply unit 321 is controlled by the power supply control unit 312.

Next, a power supply unit 302, which includes the high-voltage power supply unit 303 and the low-voltage power supply unit 304, is controlled by the power supply control unit 312, and power to the power supply unit 302 is disconnected in a sleep mode. The high-voltage power supply unit 303 is mainly used for driving motors of the printer unit 102 and the scanner unit 103 and for a heater of a fixing unit. The low-voltage power supply unit 304 supplies power to the printer unit 102, the scanner unit 103, and a power supply system 311 (power supply system 2) of the main controller unit 101.

The power supply system 311 of the main controller unit 101 is a power supply system to which power is disconnected in a sleep mode, and the HDD unit 316, the CPU unit 317, the image processing unit 318, and the operation unit 319 are connected to the power supply system 311. A power supply unit 306, which includes a scanner unit power supply unit 307, a printer unit power supply unit 308, and a power supply unit 309 for a controller power supply system 2, is controlled by the power supply control unit 312. Power to the power supply unit 306 is disconnected in a sleep mode. The scanner unit power supply unit 307 is connected to the scanner unit 103 with the high-voltage power supply unit 303 and the low-voltage power supply unit 304 being input sources. The on/off state of the scanner unit power supply unit 307 is controlled by the power supply control unit 312.

The printer unit power supply unit 308 is connected to the printer unit 102 with the high-voltage power supply unit 303 and the low-voltage power supply unit 304 being input sources. The on/off state of the printer unit power supply unit 308 is controlled by the power supply control unit 312. The power supply unit 309 for the controller power supply system 2 is connected to the power supply system 311 of the main controller unit 101 with the low-voltage power supply unit 304 being an input source. The on/off state of the power supply unit 309 is controlled by the power supply control unit 312. Next, a description will be given of sleep settings that can be made in the image forming apparatus 100.

The image forming apparatus 100 is equipped with an automatic sleep time function of enabling setting of the time at which the apparatus shifts from the normal mode to the sleep mode. The automatic sleep time function is a function of shifting, by the CPU unit 317, the apparatus from the normal mode to the sleep mode, if a time measured by the RTC unit 324 reaches a time set in advance for each day of the week.

Figure 4:
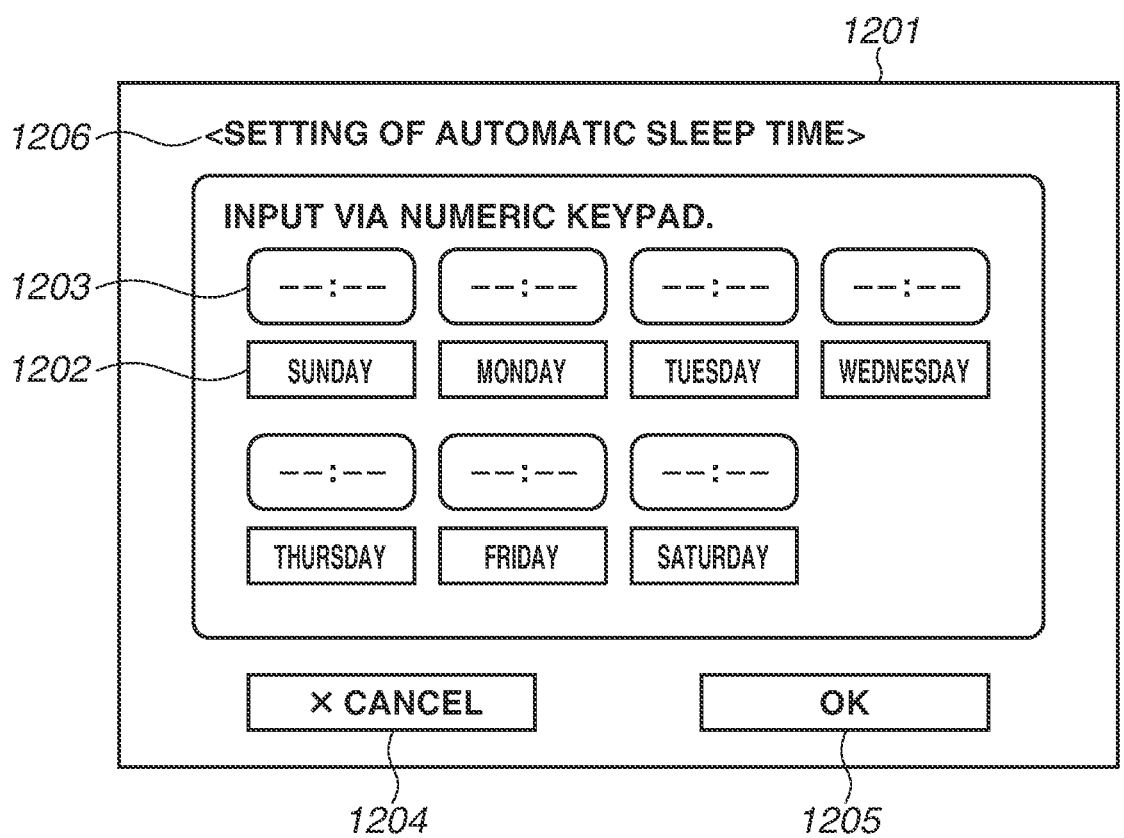
FIG. 4 is a diagram illustrating a user interface (UI) screen displayed on an operation unit of the image forming apparatus.

FIG. 4 is a diagram illustrating a user interface (UI) screen displayed on the operation unit 319 of the image forming apparatus 100 according to the present exemplary embodiment. This example particularly corresponds to an example of an automatic sleep time setting screen.

The configuration of the automatic sleep time setting screen illustrated in FIG. 4 is controlled by the CPU unit 317 based on software stored in the memory unit 315 or the HDD unit 316. A transition is made to an automatic sleep time setting screen 1201 in a case where an automatic sleep time is to be set. A title 1206 of the automatic sleep time setting screen 1201 is displayed as "setting of automatic sleep time".

To set the automatic sleep time, the user presses any of day-of-the-week buttons 1202 and inputs numbers via numeric keypad buttons (not illustrated) prepared in the operation unit 319. Consequently, the input numbers are displayed as a set time in a time display field 1203. To finish setting the automatic sleep time, the user presses an OK button 1205. If the user wishes to stop setting the automatic sleep time, the user presses a cancel button 1204 and thereby can stop setting the automatic sleep time. The set automatic sleep time is stored in the setting information 320 of the HDD unit 316.

The image forming apparatus 100 is equipped with a sleep return time function of enabling setting of the time at which the apparatus shifts from the sleep mode to the normal mode. The sleep return time function is a function of setting, by the CPU unit 317, a sleep return time in the timer unit 314 before the apparatus shifts to the sleep mode, so as to shift the apparatus to the sleep mode state. If the time set in the timer unit 314 arrives, the timer unit 314 notifies the power supply control unit 312 that the time has arrived. Then, the power supply control unit 312 turns on the components, thereby shifting the apparatus from the sleep mode to the normal mode.

Figure 5:
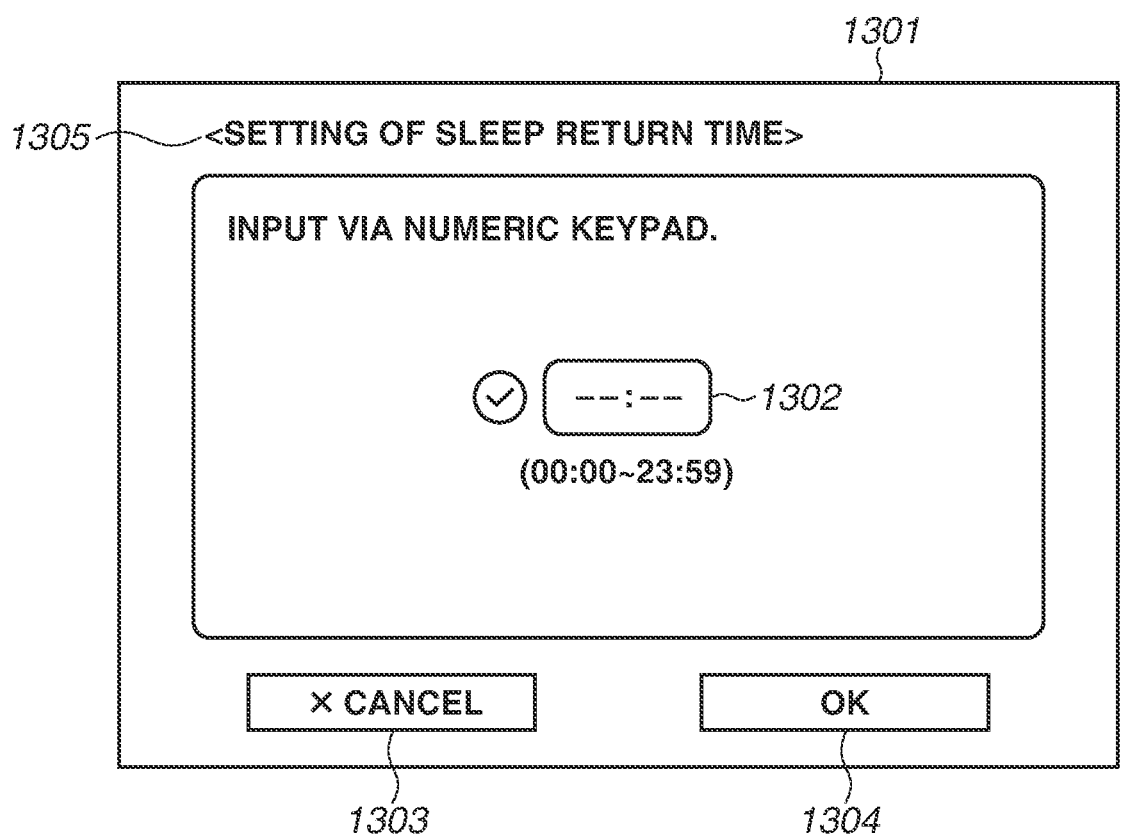
FIG. 5 is a diagram illustrating a UI screen displayed on the operation unit of the image forming apparatus.

FIG. 5 is a diagram illustrating a UI screen displayed on the operation unit 319 of the image forming apparatus 100 according to the present exemplary embodiment. This example particularly corresponds to the configuration of a sleep return time setting screen.

The configuration of the sleep return time setting screen illustrated in FIG. 5 is controlled by the CPU unit 317 based on software stored in the memory unit 315 or the HDD unit 316. A transition is made to a sleep return time setting screen 1301 in a case where a sleep return time is to be set. A title 1305 of the sleep return time setting screen 1301 is displayed as "setting of sleep return time". To set the sleep return time, the user inputs numbers via numeric keypad buttons (not illustrated) prepared in the operation unit 319. Consequently, the input numbers are displayed as a set time in a time display field 1302. To finish setting the sleep return time, the user presses an OK button 1304. If the user wishes to stop setting the sleep return time, the user presses a cancel button 1303 and thereby can stop setting the sleep return time. The set sleep return time is stored in the setting information 320 of the HDD unit 316.

A case in which the CPU unit 317 switches the image forming apparatus 100 in the normal mode to the sleep mode is not limited to a case of the automatic sleep time function. That is, there is also a case where the CPU unit 317 shifts the image forming apparatus 100 to the sleep mode by a sleep automatic shift function or the pressing of the sleep mode shift/cancellation button. The sleep automatic shift function is a function of shifting, by the CPU unit 317, the image forming apparatus 100 to the sleep mode if a job such as printing, copying, or scanning is not performed within a certain time period set in advance. Also in a case where the human sensor unit 104 does not detect a person within a certain time period, the image forming apparatus 100 can be shifted to the sleep mode by the sleep automatic shift function.

Figure 6:
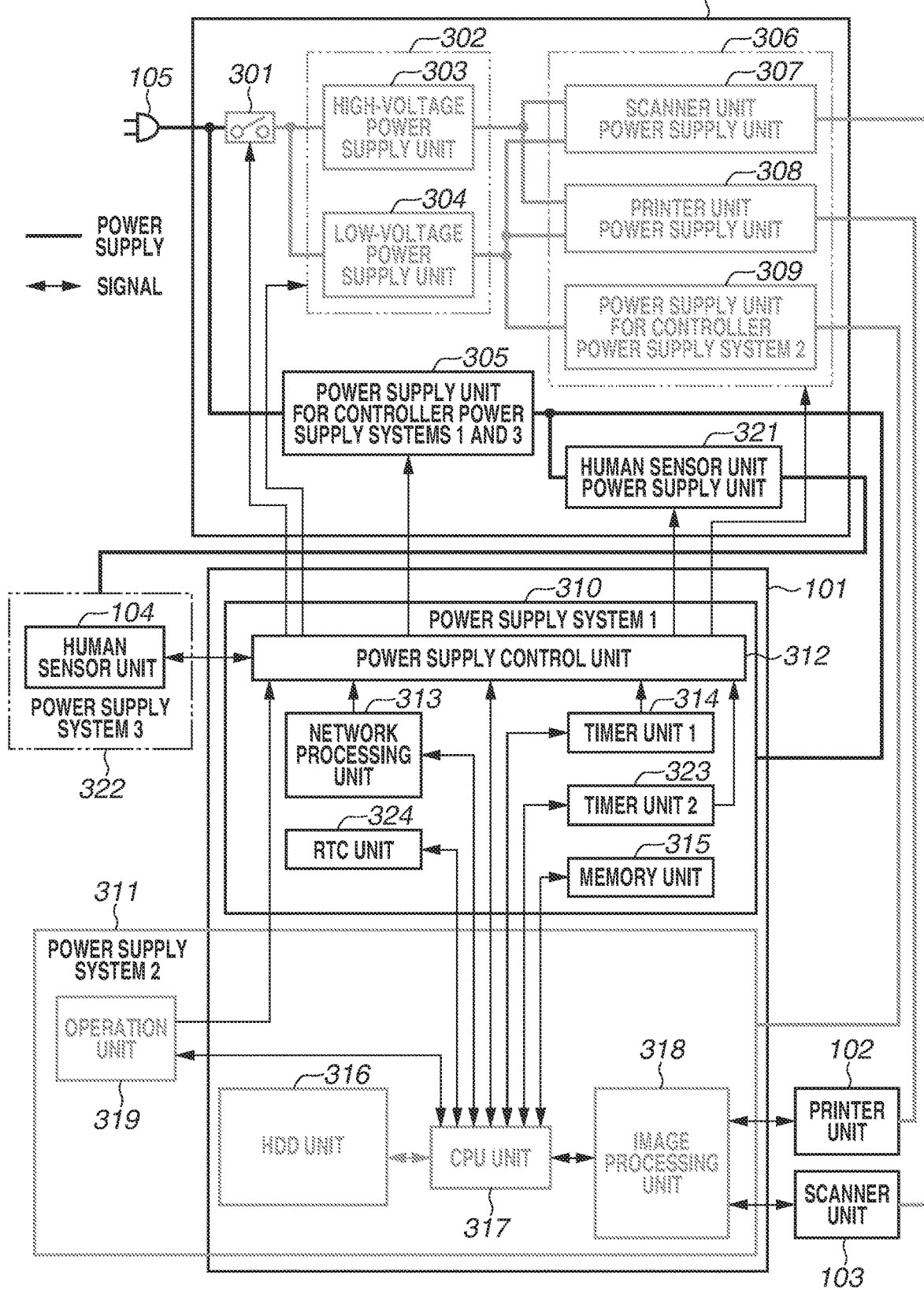
FIG. 6 is a block diagram illustrating power states of the power supply systems of the image forming apparatus.

FIG. 6 is a block diagram illustrating power states of the power supply systems of the image forming apparatus 100 according to the present exemplary embodiment. This example corresponds to power supply states in the sleep mode state (the normal sleep mode) where power is supplied to the human sensor unit 104. In the normal mode, power is supplied to all the blocks illustrated in FIG. 3. The image forming apparatus 100 may be configured such that power is supplied only to necessary functions at this time, but will not be described here.

In the normal sleep mode, as illustrated in FIG. 6, power is supplied to some of the blocks. First, alternating current commercial power is supplied to the power supply unit 305 for the controller power supply systems 1 and 3 via the AC plug 105. The blocks to which the power supply unit 305 for the controller power supply systems 1 and 3 supplies power are the human sensor unit power supply unit 321, the power supply control unit 312, the network processing unit 313, the timer unit 314, the timer unit 323, the RTC unit 324, and the memory unit 315. The block to which the human sensor unit power supply unit 321 supplies power is the human sensor unit 104. Although power to the operation unit 319 is disconnected in the description, the image forming apparatus 100 is configured such that the power supply control unit 312 can detect the pressing of the sleep mode shift/cancellation button.

Figure 7:
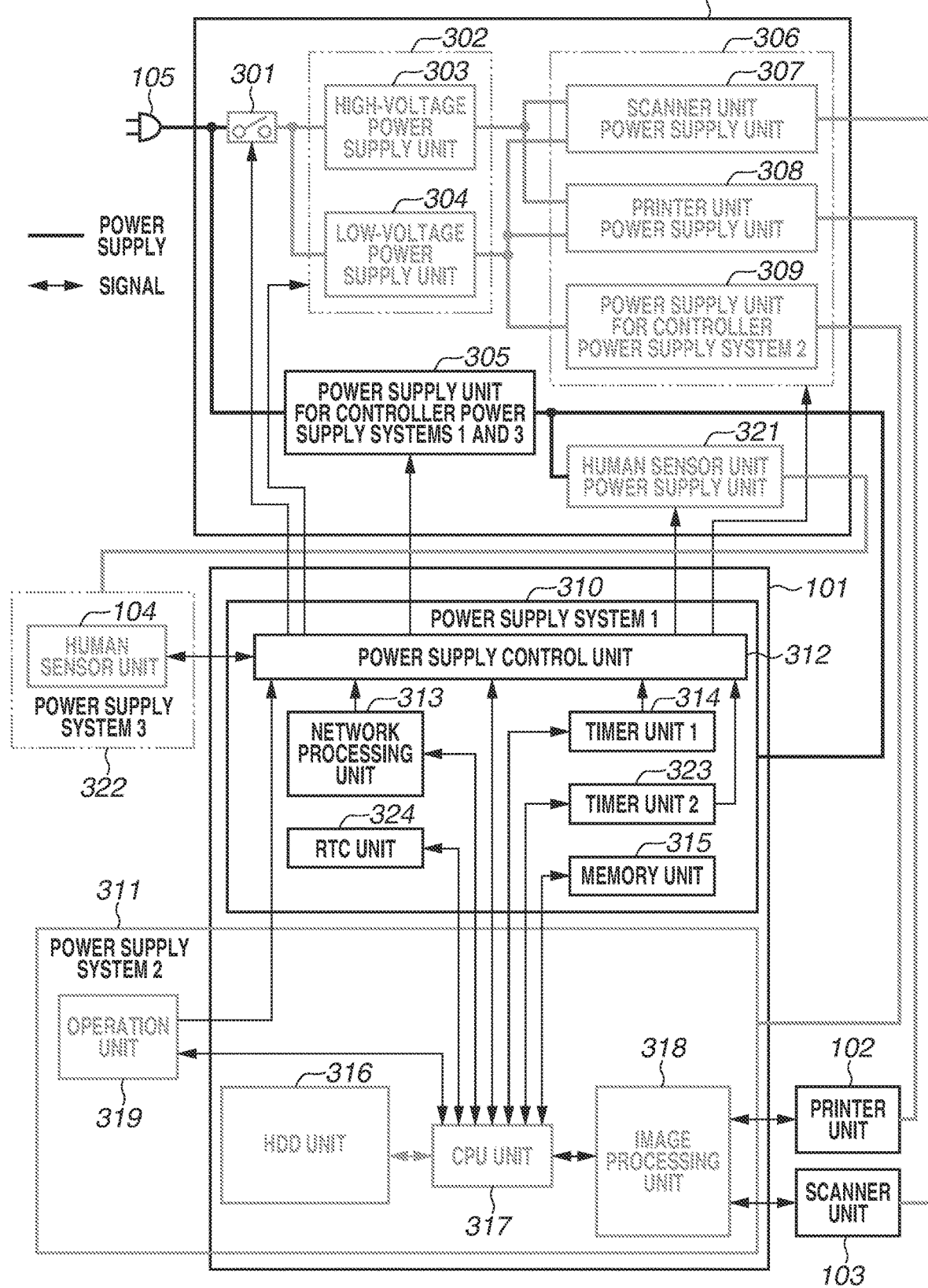
FIG. 7 is a block diagram illustrating power states of the power supply systems of the image forming apparatus.

FIG. 7 is a block diagram illustrating power states of the power supply systems of the image forming apparatus 100 according to the present exemplary embodiment. This example corresponds to power supply states in the sleep mode state (the human sensor power disconnection sleep mode) where power to the human sensor unit 104 is disconnected.

In the human sensor power disconnection sleep mode, as illustrated in FIG. 7, power is supplied to some of the blocks. The human sensor power disconnection sleep mode is different from the normal sleep mode in that power to the human sensor unit power supply unit 321 and the human sensor unit 104 is disconnected.

Figure 8:
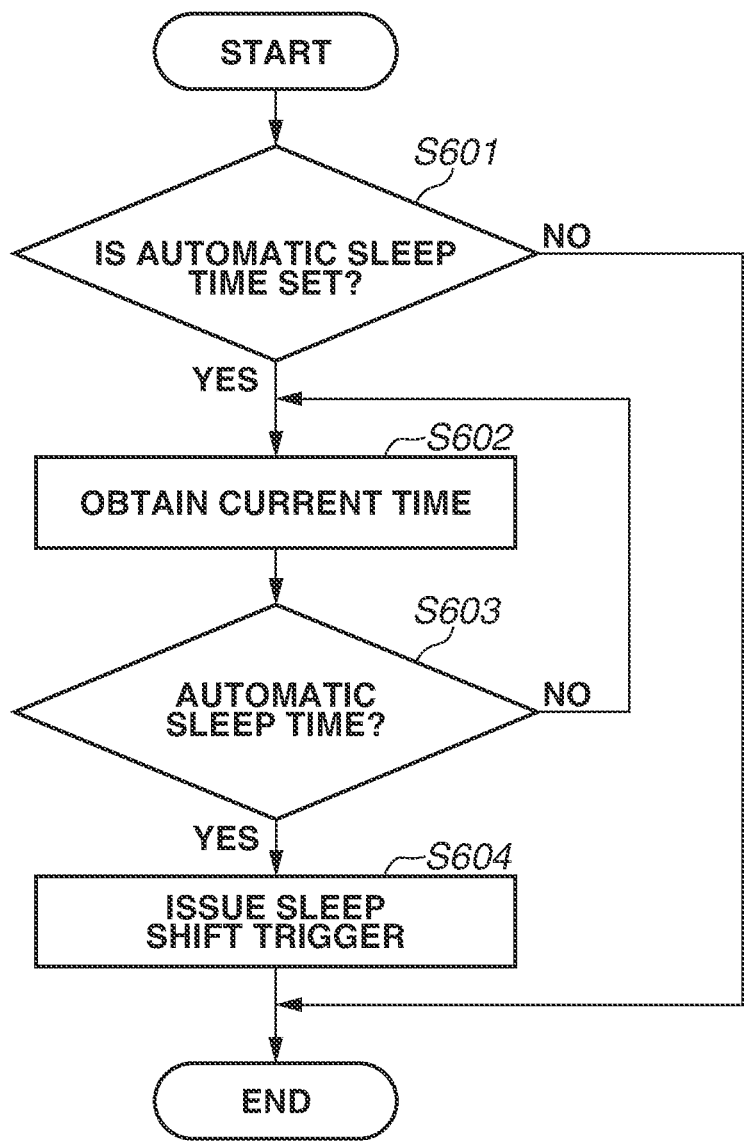
FIG. 8 is a flow chart illustrating a method for controlling the image forming apparatus.

FIG. 8 is a flow chart illustrating a method for controlling the image forming apparatus 100 according to the present exemplary embodiment. This example corresponds to an example of a time confirmation sequence of the automatic sleep time function. Each step is realized by the CPU unit 317 executing a control program loaded into the memory unit 315.

First, in step S601, the CPU unit 317 determines the setting information 320 of the HDD unit 316 to confirm whether the automatic sleep time is set. If the CPU unit 317 determines that the automatic sleep time is set (YES in step S601), then in step S602, the CPU unit 317 accesses the RTC unit 324 and obtains the current time. If the automatic sleep time is not set (NO in step S601), the time confirmation sequence of the automatic sleep time function ends. In step S603, the CPU unit 317 compares the obtained current time with the automatic sleep time. If the times match each other (YES in step S603), then in step S604, the CPU unit 317 notifies a sleep mode shift sequence that a sleep shift trigger has occurred. If the current time does not match the automatic sleep time (NO in step S603), the CPU unit 317 periodically accesses the RTC unit 324 and waits for the current time to match the automatic sleep time.

Figure 9:
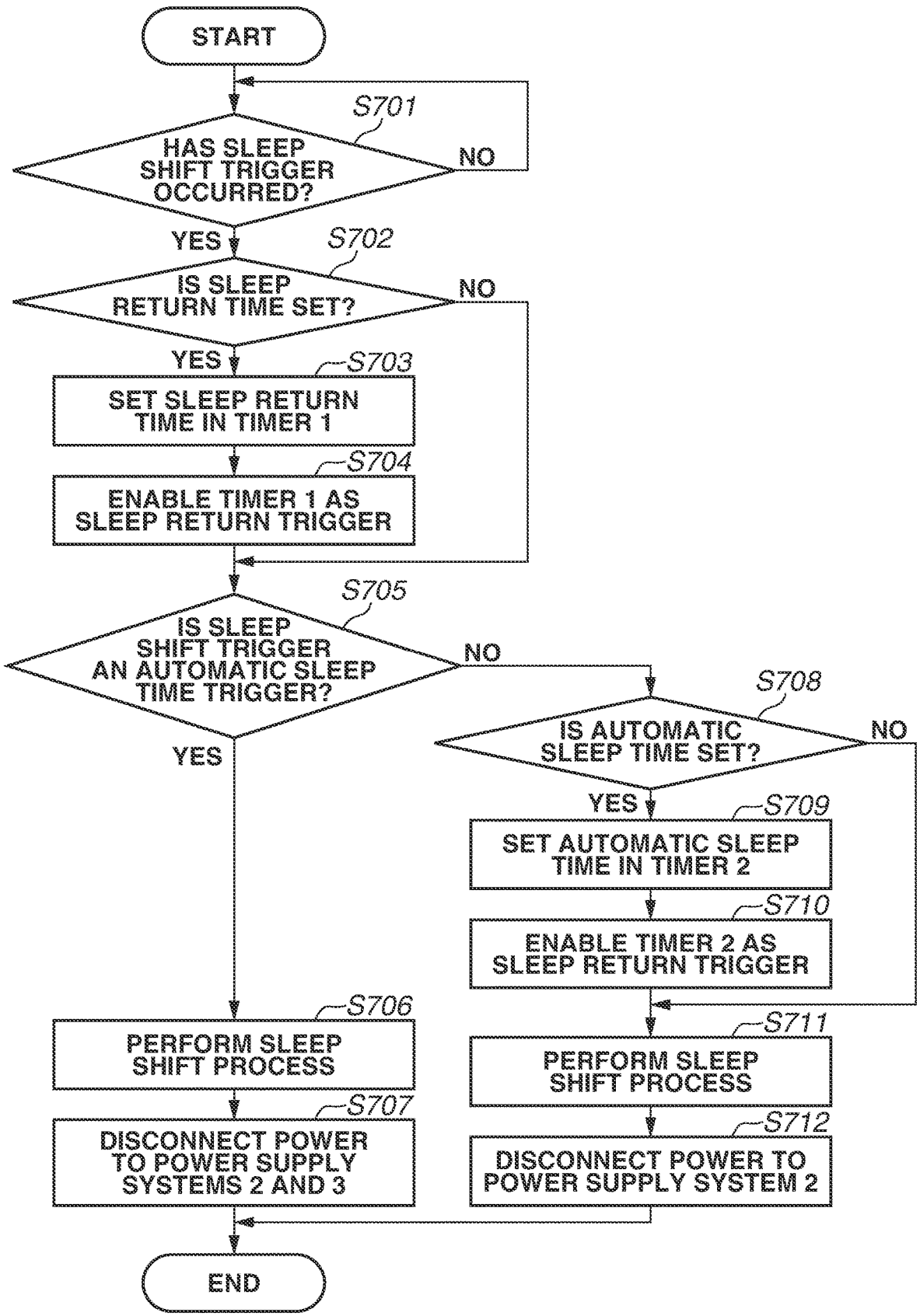
FIG. 9 is a flow chart illustrating a method for controlling the image forming apparatus.

FIG. 9 is a flow chart illustrating a method for controlling the image forming apparatus 100 according to the present exemplary embodiment. This example corresponds to an example of a sleep mode shift sequence. Each step is realized by the CPU unit 317 executing a control program loaded into the memory unit 315.

First, in step S701, the CPU unit 317 confirms the state of an automatic sleep time sequence, the state of a sleep automatic shift sequence, and via the power supply control unit 312, the state of the sleep mode shift/cancellation button of the operation unit 319 to determine whether a sleep shift trigger has occurred. If the CPU unit 317 determines that a sleep mode shift instruction is not issued (NO in step S701), the CPU unit 317 periodically polls for the states of the components until a sleep mode shift instruction is issued.

If, on the other hand, the CPU unit 317 determines that a sleep shift trigger has occurred (YES in step S701), then in step S702, the CPU unit 317 confirms the setting information 320 of the HDD unit 316 to determine whether the sleep return time is set.

If the CPU unit 317 determines that the sleep return time is set (YES in step S702), then in step S703, the CPU unit 317 sets the sleep return time in the timer unit 314. In step S704, the CPU unit 317 enables the timer unit 314 as a sleep return trigger. If the CPU unit 317 determines that the sleep return time is not set (NO in step S702), the CPU unit 317 does not set the timer unit 314. Next, in step S705, the CPU unit 317 confirms the state of the automatic sleep time sequence to confirm whether the sleep shift trigger is an automatic sleep time trigger.

If the sleep shift trigger is an automatic sleep time trigger (YES in step S705), then in step S706, the CPU unit 317 performs a sleep mode shift process of software such as evacuating data from the image processing unit 318, according to a control program stored in the HDD unit 316. After the sleep mode shift process of software has ended, in step S707, the CPU unit 317 instructs the power supply control unit 312 to disconnect power to the power supply systems 2 and 3. If the power supply control unit 312 receives from the CPU unit 317 the instruction for disconnecting power to the power supply systems 2 and 3, the power supply control unit 312 disconnects power to the relay 301, the power supply unit 302, the power supply unit 306, and the human sensor unit power supply unit 321, and completes the shift to the human sensor power disconnection sleep mode.

If the CPU unit 317 determines that the sleep shift trigger is not an automatic sleep time trigger (NO in step S705), then in step S708, the CPU unit 317 confirms the setting information 320 of the HDD unit 316 to determine whether the automatic sleep time is set. If the CPU unit 317 determines that the automatic sleep time is set (YES in step S708), then in step S709, the CPU unit 317 sets the automatic sleep time in the timer unit 323. Then, in step S710, the CPU unit 317 enables the timer unit 323 as a sleep return trigger.

If the CPU unit 317 determines that the automatic sleep time is not set (NO in step S708), the CPU unit 317 does not set the timer unit 323. Next, in step S711, the CPU unit 317 performs a sleep mode shift process of software. In step S712, the CPU unit 317 then instructs the power supply control unit 312 to disconnect power to the power supply system 2. If the power supply control unit 312 receives from the CPU unit 317 the instruction for disconnecting power to the power supply system 2, the power supply control unit 312 disconnects power to the relay 301, the power supply unit 302, and the power supply unit 306, and completes the shift to the normal sleep mode.

Figure 10:
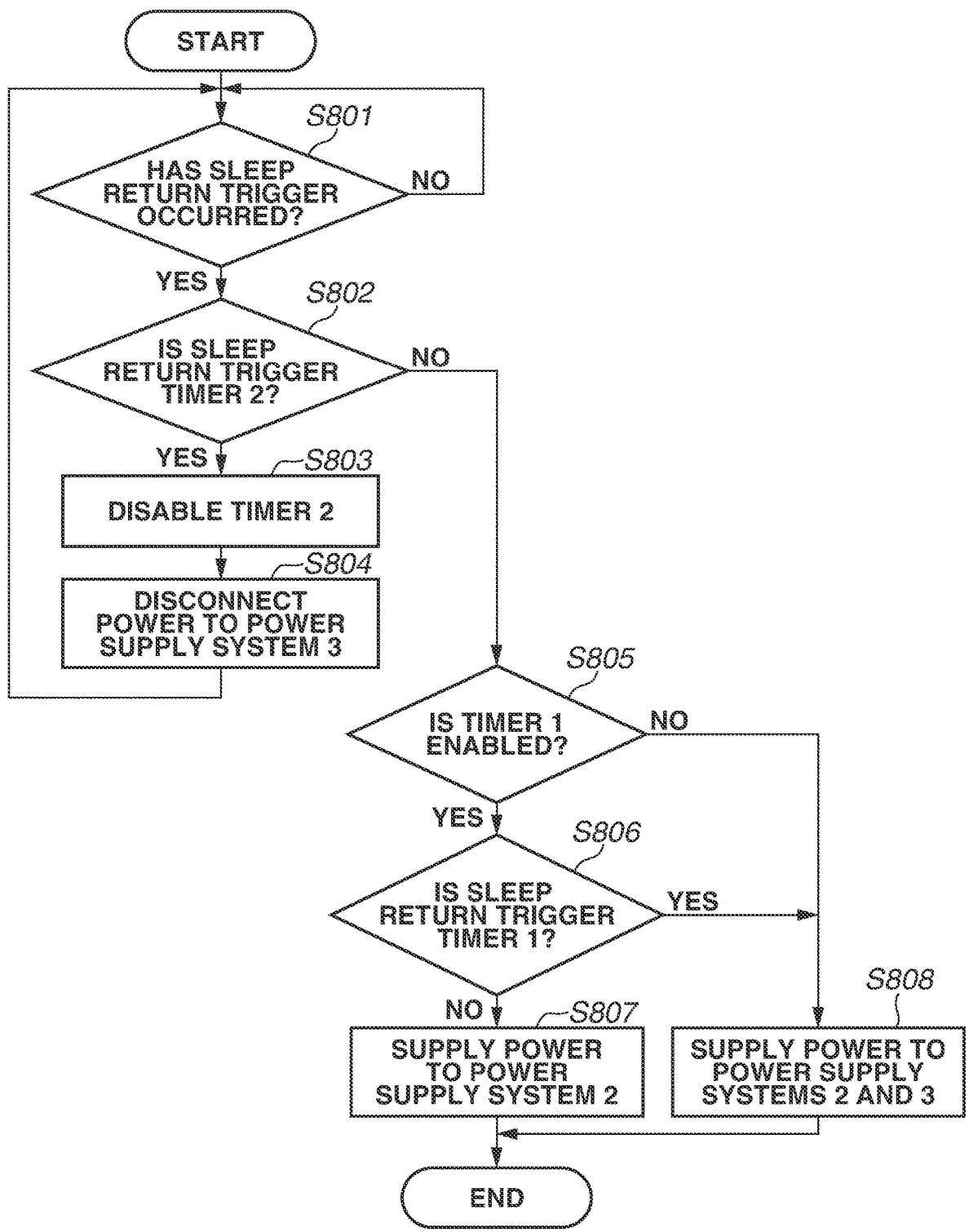
FIG. 10 is a flow chart illustrating a method for controlling the image forming apparatus.

FIG. 10 is a flow chart illustrating a method for controlling the image forming apparatus 100 according to the present exemplary embodiment. This example corresponds to an example of a sleep mode return sequence of the power supply control unit 312. Each step is realized by the power supply control unit 312 executing a control program.

First, in step S801, the power supply control unit 312 determines the states of the network processing unit 313, the human sensor unit 104, the sleep mode shift/cancellation button of the operation unit 319, the timer unit 314, and the timer unit 323 to determine whether a sleep return trigger has occurred. If the power supply control unit 312 determines that a sleep return trigger has not occurred (NO in step S801), the power supply control unit 312 periodically polls for the states of the components until a sleep return trigger occurs.

If, on the other hand, the power supply control unit 312 determines in step S801 that a sleep return trigger has occurred (YES in step S801), then in step S802, the power supply control unit 312 determines whether the sleep return trigger is the timer unit 323. If the power supply control unit 312 determines that the sleep return trigger is the timer unit 323 (YES in step S802), then in step S803, the power supply control unit 312 disables the timer unit 323.

After disabling the timer unit 323, then in step S804, the power supply control unit 312 disconnects the supply of power to the human sensor unit power supply unit 321, which supplies power to the power supply system 3 (a power supply system 322). Consequently, the power supply control unit 312 shifts the image forming apparatus 100 to the human sensor power disconnection sleep mode.

If, on the other hand, the power supply control unit 312 determines in step S802 that the sleep return trigger is not the timer unit 323 (NO in step S802), then in step S805, the power supply control unit 312 determines whether the timer unit 314 is enabled as a sleep return trigger.

If the power supply control unit 312 determines that the timer unit 314 is enabled (YES in step S805), then in step S806, the power supply control unit 312 determines whether the sleep return trigger is the timer unit 314. If the power supply control unit 312 determines that the sleep return trigger is not the timer unit 314 (NO in step S806), then in step S807, to supply power to the power supply system 2, the power supply control unit 312 turns on the relay 301, the power supply unit 302, and the power supply unit 306, and starts the supply of power to the components. Then, the processing ends.

If, on the other hand, the power supply control unit 312 determines in step S805 that the timer unit 314 is disabled (NO in step S805), then in step S808, to supply power to the power supply systems 2 and 3, the power supply control unit 312 turns on the relay 301, the power supply unit 302, the power supply unit 306, and the human sensor unit power supply unit 321, and starts the supply of power to the components. Then, the processing ends.

In addition, if the power supply control unit 312 determines in step S806 that the sleep return trigger is the timer unit 314 (YES in step S806), similarly, in step S808, the power supply control unit 312 starts the supply of power to the power supply systems 2 and 3. Then, the processing ends.

Figure 11:
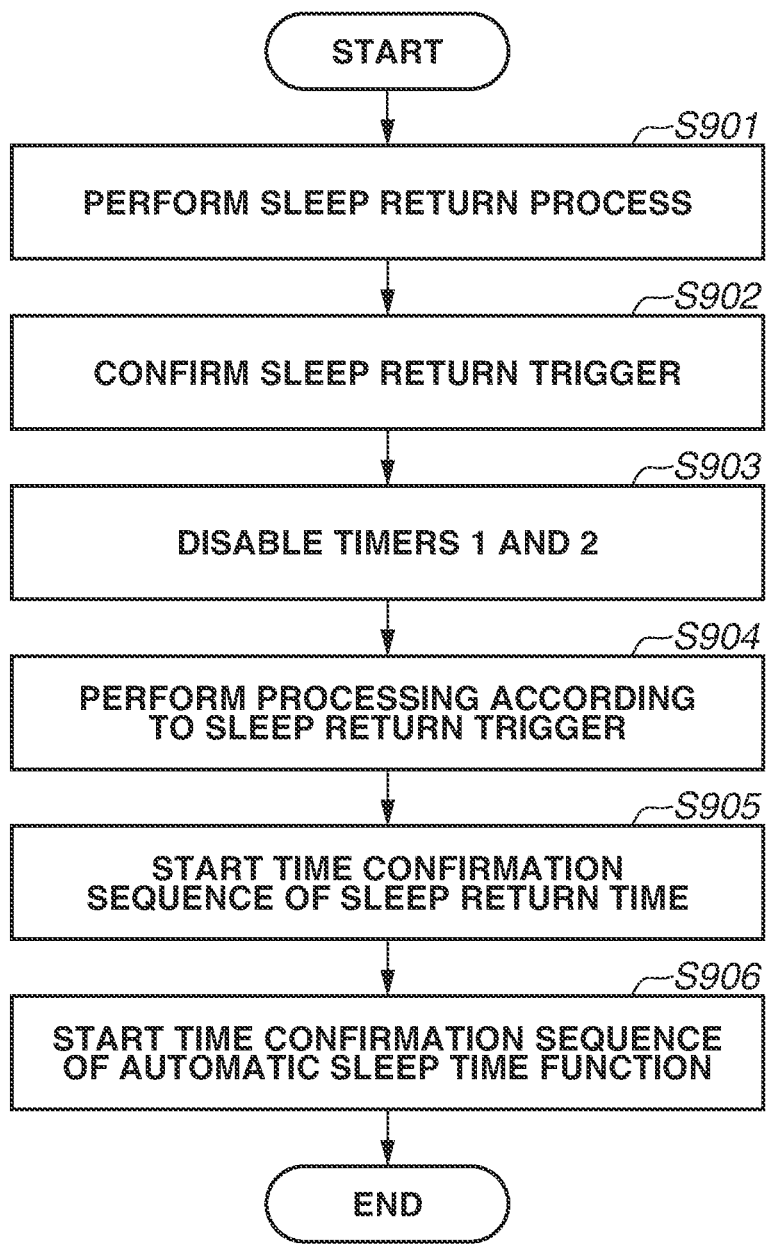
FIG. 11 is a flow chart illustrating a method for controlling the image forming apparatus.

FIG. 11 is a flow chart illustrating a method for controlling the image forming apparatus 100 according to the present exemplary embodiment. This example corresponds to an example of the sleep mode return sequence. Each step is realized by the CPU unit 317 executing a control program loaded into the memory unit 315.

If the power supply system 2 is turned on, power is also supplied to the CPU unit 317, and the CPU unit 317 performs a sleep mode return process. In the sleep mode return process, first, in step S901, the CPU unit 317 performs the sleep mode return process of software such as restoring data in the image processing unit 318, according to a control program stored in the HDD unit 316 or the memory unit 315. After the sleep mode return process has ended, then in step S902, the CPU unit 317 accesses the power supply control unit 312 to confirm the normal mode shift trigger.

After confirming the normal mode return trigger, then in step S903, the CPU unit 317 disables the timer units 314 and 323. Then, in step S904, the CPU unit 317 performs processing according to the sleep return trigger. After the processing according to the sleep return trigger has ended, then in step S905, the CPU unit 317 starts a time confirmation sequence of the sleep return time illustrated in FIG. 12. Next, in step S906, the CPU unit 317 starts the time confirmation sequence of the automatic sleep time function illustrated in FIG. 8.

Figure 12:
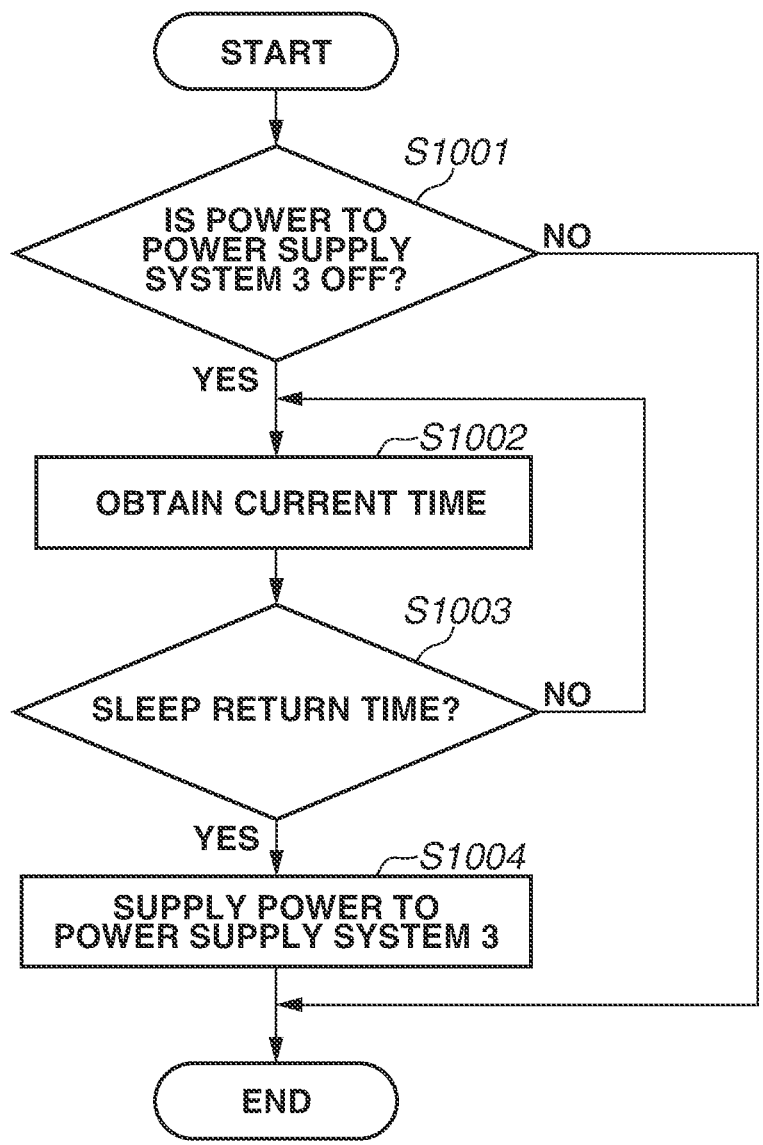
FIG. 12 is a flow chart illustrating a method for controlling the image forming apparatus.

FIG. 12 is a flow chart illustrating a method for controlling the image forming apparatus 100 according to the present exemplary embodiment. This example corresponds to an example of a time confirmation sequence of the sleep return time. Each step is realized by the CPU unit 317 executing a control program loaded into the memory unit 315.

First, in step S1001, the CPU unit 317 confirms the state of the human sensor unit power supply unit 321 via the power supply control unit 312 to confirm whether power to the power supply system 3 is disconnected by the automatic sleep time function. If power to the power supply system 3 is disconnected (YES in step S1001), then in step S1002, the CPU unit 317 accesses the RTC unit 324 and obtains the current time.

If, on the other hand, the CPU unit 317 determines in step S1001 that power to the power supply system 3 is not disconnected (NO in step S1001), the time confirmation sequence of the sleep return time ends.

Next, in step S1003, the CPU unit 317 compares the obtained current time with the sleep return time of the setting information 320, thereby determining whether the current time matches the sleep return time. If the CPU unit 317 determines that the current time matches the sleep return time (YES in step S1003), then in step S1004, the CPU unit 317 turns on the human sensor unit power supply unit 321, and starts the supply of power to the power supply system 3, which is the power supply for the human sensor unit 104. Then, the processing ends.

If, on the other hand, the CPU unit 317 determines that the current time does not match the sleep return time (NO in step S1003), the CPU unit 317 periodically accesses the RTC unit 324 and waits for the current time to match the sleep return time.

As described above, according to the present exemplary embodiment, if the automatic sleep time has passed, the image forming apparatus 100 is shifted to the sleep mode where power to the human sensor unit 104 is disconnected. This can restrict the operation by the human sensor unit 104 at the time when the user intentionally tries to put the image forming apparatus 100 to sleep.

A sleep return trigger includes an operation trigger caused by the operation unit 319, a communication trigger caused by the network processing unit 313, which performs communication, and a detection trigger caused by the human sensor unit 104.

In a second exemplary embodiment, a description will be given of a case where, by the automatic sleep time function, the time at which the image forming apparatus 100 shifts to the sleep mode and whether to enable or disable the human sensor unit 104 at the time of the shift to the sleep mode at the automatic sleep time can be set.

In this case, by the automatic sleep time function, an item for setting, for each day of the week or each date, the time at which the user wishes the image forming apparatus 100 to shift to sleep, and whether to enable or disable the human sensor unit 104 at the time of the shift to sleep can be selected. When the human sensor unit 104 is set to enabled and if the automatic sleep time arrives, the image forming apparatus 100 shifts to the normal sleep mode. When the human sensor unit 104 is set to disabled and if the automatic sleep time arrives, the image forming apparatus 100 shifts to the human sensor power disconnection sleep mode. The configuration of the image forming apparatus 100 is similar to that of the first exemplary embodiment and therefore will not be described here.

Figure 13:
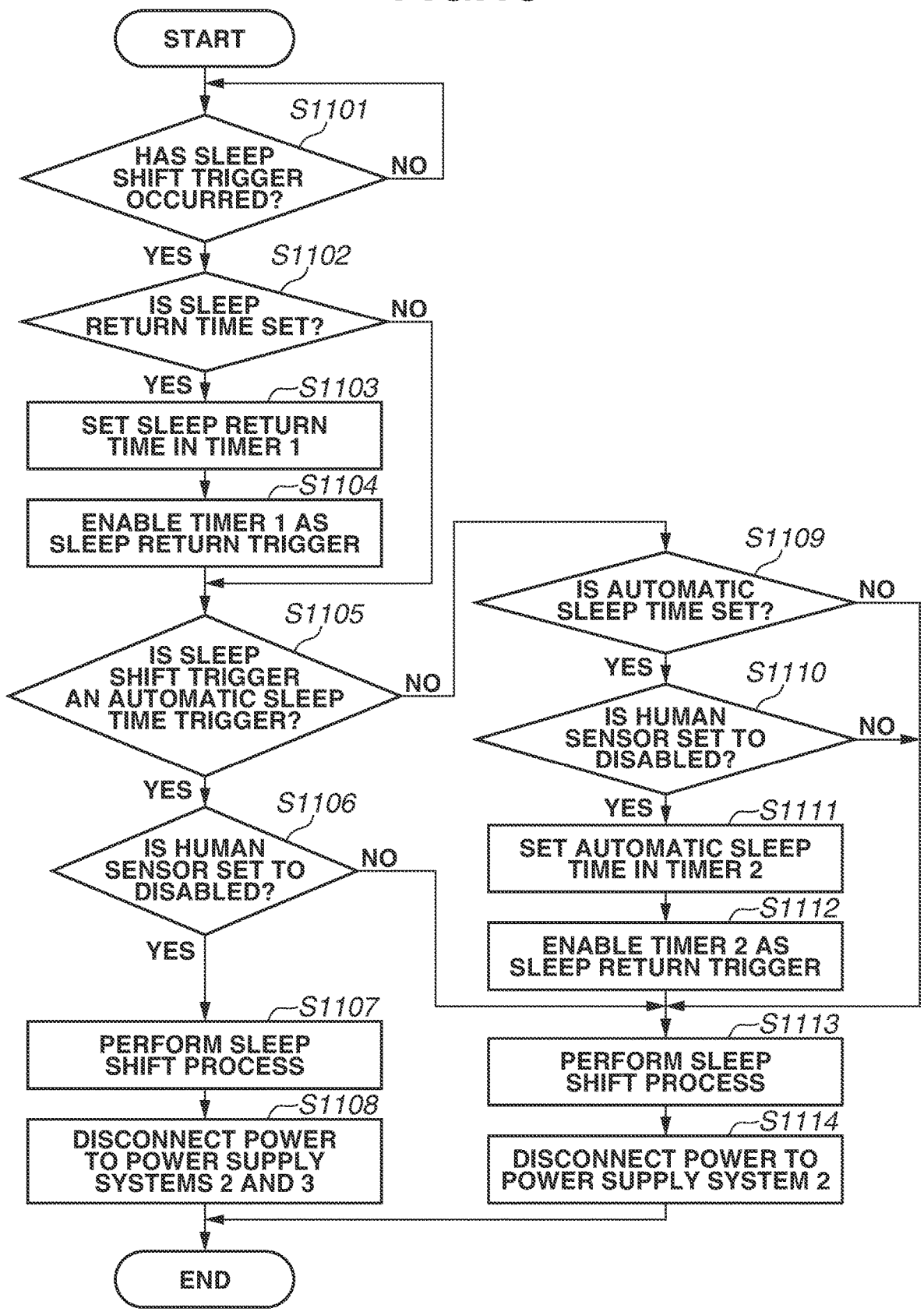
FIG. 13 is a flow chart illustrating a method for controlling an image forming apparatus.

FIG. 13 is a flow chart illustrating a method for controlling the image forming apparatus 100 according to the present exemplary embodiment. This example corresponds to an example of a sleep mode shift sequence. Each step is realized by the CPU unit 317 executing a control program loaded into the memory unit 315.

First, in step S1101, the CPU unit 317 confirms the state of an automatic sleep time sequence, the state of a sleep automatic shift sequence, and via the power supply control unit 312, the state of the sleep mode shift/cancellation button of the operation unit 319 to confirm whether a sleep shift trigger has occurred, thereby determining whether a sleep mode shift instruction has been issued. If the CPU unit 317 determines that a sleep mode shift instruction has not been issued (NO in step S1101), the CPU unit 317 periodically polls for the states of the components until a sleep mode shift instruction is issued.

If, on the other hand, the CPU unit 317 determines in step S1101 that a sleep shift trigger has occurred (YES in step S1101), then in step S1102, the CPU unit 317 confirms the setting information 320 of the HDD unit 316 to determine whether the sleep return time is set.

If the CPU unit 317 determines that the sleep return time is set (YES in step S1102), then in step S1103, the CPU unit 317 sets the sleep return time in the timer unit 314. In step S1104, the CPU unit 317 enables the timer unit 314 as a sleep return trigger.

If the CPU unit 317 determines that the sleep return time is not set (NO in step S1102), the CPU unit 317 does not set the timer unit 314. Next, in step S1105, the CPU unit 317 confirms the state of the automatic sleep time sequence to determine whether the sleep shift trigger is an automatic sleep time trigger.

If the CPU unit 317 determines that the sleep shift trigger is an automatic sleep time trigger (YES in step S1105), then in step S1106, the CPU unit 317 confirms the setting information 320 of the HDD unit 316 to determine whether the state setting of the human sensor unit 104 at the time of the shift to sleep is set to disabled.

If the CPU unit 317 determines that the state setting of the human sensor unit 104 at the time of the shift to sleep is set to disabled (YES in step S1106), then in step S1107, the CPU unit 317 performs a sleep mode shift process of software such as evacuating data from the image processing unit 318, according to a control program. Then, after the sleep mode shift process of software has ended, in step S1108, the CPU unit 317 instructs the power supply control unit 312 to disconnect power to the power supply systems 2 and 3. If the power supply control unit 312 receives from the CPU unit 317 the instruction for disconnecting power to the power supply systems 2 and 3, the power supply control unit 312 disconnects power to the relay 301, the power supply unit 302, the power supply unit 306, and the human sensor unit power supply unit 321, and completes the shift to the human sensor power disconnection sleep mode.

If, on the other hand, the CPU unit 317 determines in step S1105 that the sleep shift trigger is not an automatic sleep time trigger (NO in step S1105), then in step S1109, the CPU unit 317 confirms the setting information 320 of the HDD unit 316 to determine whether the automatic sleep time is set.

If the CPU unit 317 determines that the automatic sleep time is set (YES in step S1109), then in step S1110, the CPU unit 317 confirms the setting information 320 of the HDD unit 316 to determine whether the state setting of the human sensor unit 104 at the time of the shift to sleep is set to disabled.

If the CPU unit 317 determines that the state setting of the human sensor unit 104 at the time of the shift to sleep is set to disabled (YES in step S1110), then in step S1111, the CPU unit 317 sets the automatic sleep time in the timer unit 323. Then, in step S1112, the CPU unit 317 enables the timer unit 323 as a sleep return trigger.

On the other hand, if the CPU unit 317 determines in step S1109 that the automatic sleep time is not set (NO in step S1109), or if the CPU unit 317 determines in step S1110 that the state setting of the human sensor unit 104 at the time of the shift to sleep is set to enabled (NO in step S1110), the CPU unit 317 does not set the timer unit 323.

Next, in step S1113, the CPU unit 317 performs a sleep mode shift process of software. Then, in step S1114, the CPU unit 317 instructs the power supply control unit 312 to disconnect power to the power supply system 2. If the power supply control unit 312 receives from the CPU unit 317 the instruction for disconnecting power to the power supply system 2, the power supply control unit 312 disconnects power to the relay 301, the power supply unit 302, and the power supply unit 306, and completes the shift to the normal sleep mode.

As described above, according to the present exemplary embodiment, by the automatic sleep time function, whether to enable or disable the human sensor unit 104 at the time of the shift to the sleep mode can be set. That is, it is possible to set the human sensor power disconnection sleep mode for preventing erroneous detection of the human sensor unit 104 only on dates and times when the image forming apparatus 100 is particularly less frequently used, such as Saturday and Sunday. Thus, it is possible to maintain user convenience and suppress an unnecessary shift to the normal mode.

In a third exemplary embodiment, a description will be given of a case where only power to the human sensor unit 104 can be controlled by setting a time. In the third exemplary embodiment, the image forming apparatus 100 is equipped with a human sensor off time function of setting the time at which only power to the human sensor unit 104 is disconnected from the normal mode.

The human sensor off time function is a function of shifting, by the CPU unit 317, the image forming apparatus 100 from the normal mode to the human sensor power disconnection normal mode, where power to the human sensor unit 104 is disconnected, if a time measured by the RTC unit 324 reaches a time set in advance for each day of the week.

Figure 14:
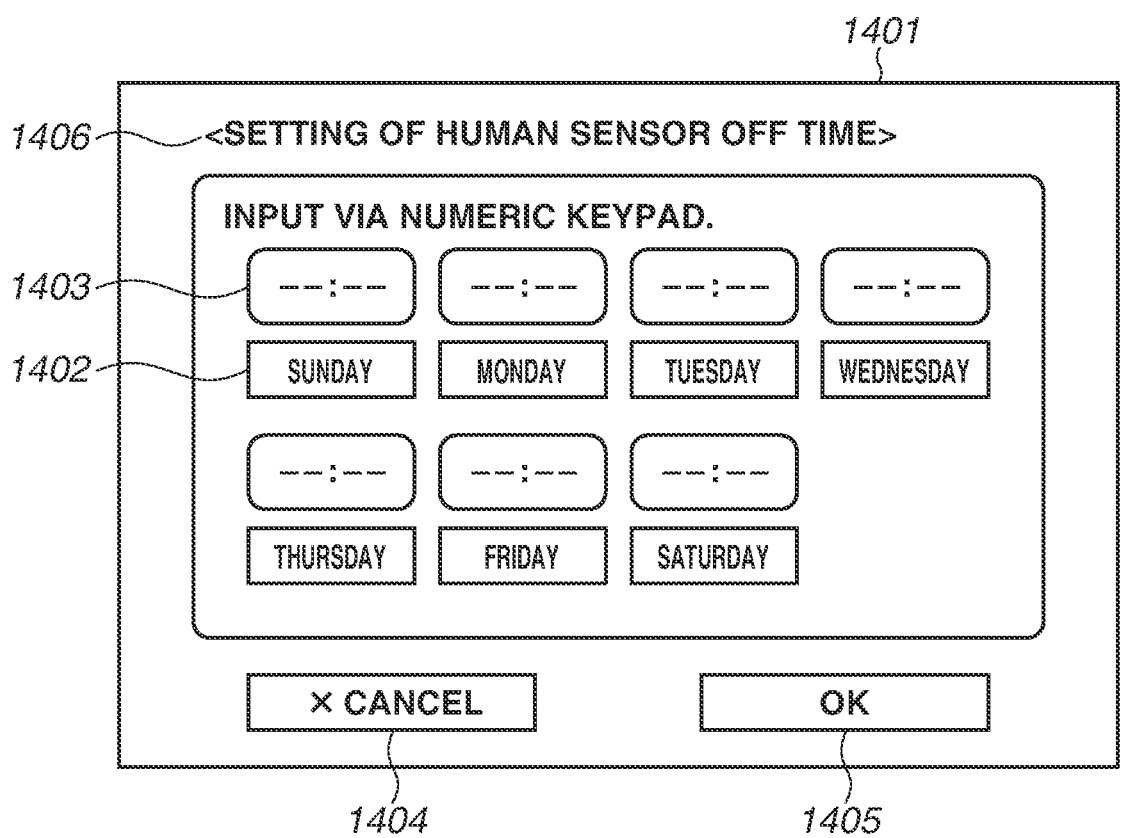
FIG. 14 is a diagram illustrating a UI screen displayed on an operation unit of an image forming apparatus.

FIG. 14 is a diagram illustrating a UI screen displayed on the operation unit 319 of the image forming apparatus 100 according to the present exemplary embodiment. This example corresponds to an example of a human sensor off time setting screen.

The configuration of the human sensor off time setting screen illustrated in FIG. 14 is controlled by the CPU unit 317 based on software stored in the memory unit 315 or the HDD unit 316. A transition is made to a human sensor off time setting screen 1401 in a case where a human sensor off time is to be set. A title 1406 of the human sensor off time setting screen 1401 is displayed as "setting of human sensor off time". To set the human sensor off time, the user presses any of day-of-the-week buttons 1402 and inputs numbers via numeric keypad buttons (not illustrated) prepared in the operation unit 319. Consequently, the input numbers are displayed as a set time in a time display field 1403.

To finish setting the human sensor off time, the user presses an OK button 1405. If the user wishes to stop setting the human sensor off time, the user presses a cancel button 1404 and thereby can stop setting the human sensor off time. The set human sensor off time is stored in the setting information 320 of the HDD unit 316.

The image forming apparatus 100 is equipped with a human sensor on time function of setting the time at which the image forming apparatus 100 shifts from the human sensor power disconnection normal mode to the normal mode. The human sensor on time function is a function of shifting, by the CPU unit 317, the image forming apparatus 100 from the human sensor power disconnection normal mode to the normal mode, if a time measured by the RTC unit 324 reaches a time set in advance for each day of the week.

Figure 15:
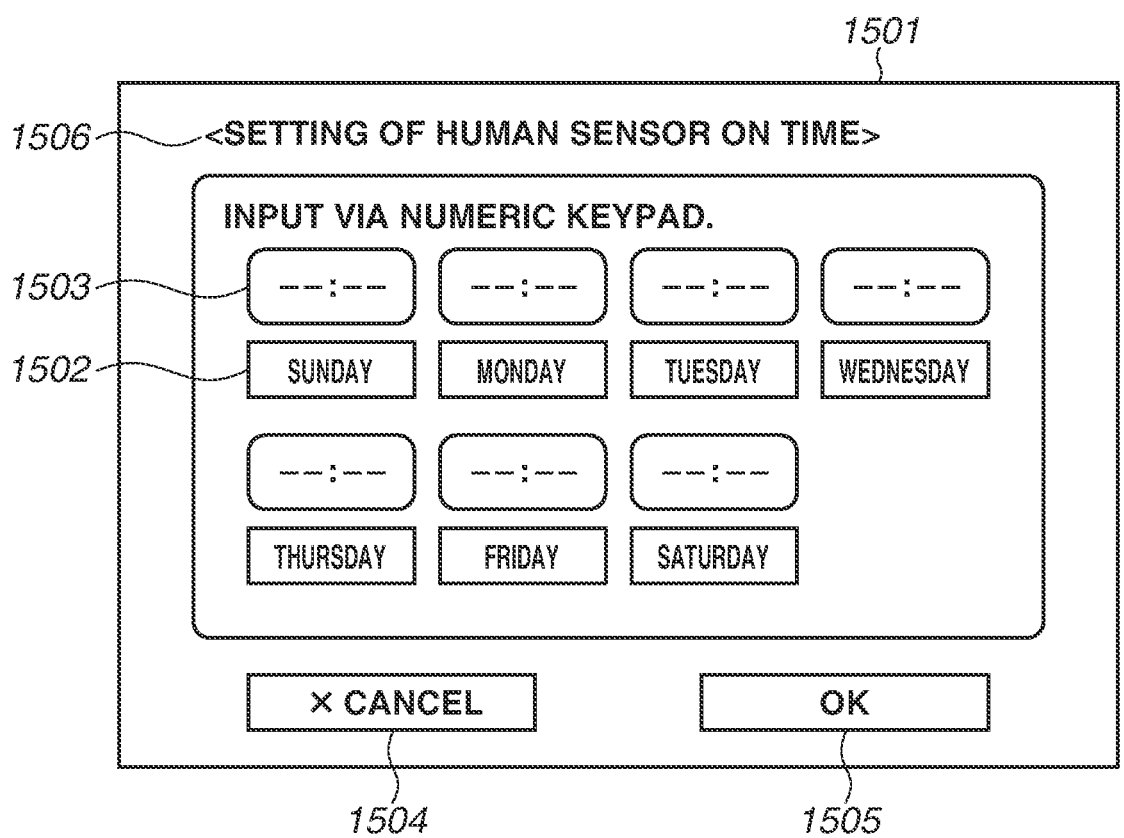
FIG. 15 is a diagram illustrating a UI screen displayed on the operation unit of the image forming apparatus.

FIG. 15 is a diagram illustrating a UI screen displayed on the operation unit 319 of the image forming apparatus 100 according to the present exemplary embodiment. This example corresponds to an example of a human sensor on time setting screen.

The configuration of the human sensor on time setting screen illustrated in FIG. 15 is controlled by the CPU unit 317 based on software stored in the memory unit 315 or the HDD unit 316. A transition is made to a human sensor on time setting screen 1501 in a case where a human sensor on time is to be set. A title 1506 of the human sensor on time setting screen 1501 is displayed as "setting of human sensor on time". To set the human sensor on time, the user presses any of day-of-the-week buttons 1502 and inputs numbers via numeric keypad buttons (not illustrated) prepared in the operation unit 319. Consequently, the input numbers are displayed as a set time in a time display field 1503.

To finish setting the human sensor on time, the user presses an OK button 1505. If the user wishes to stop setting the human sensor on time, the user presses a cancel button 1504 and thereby can stop setting the human sensor on time. The set human sensor on time is stored in the setting information 320 of the HDD unit 316.

Figure 16:
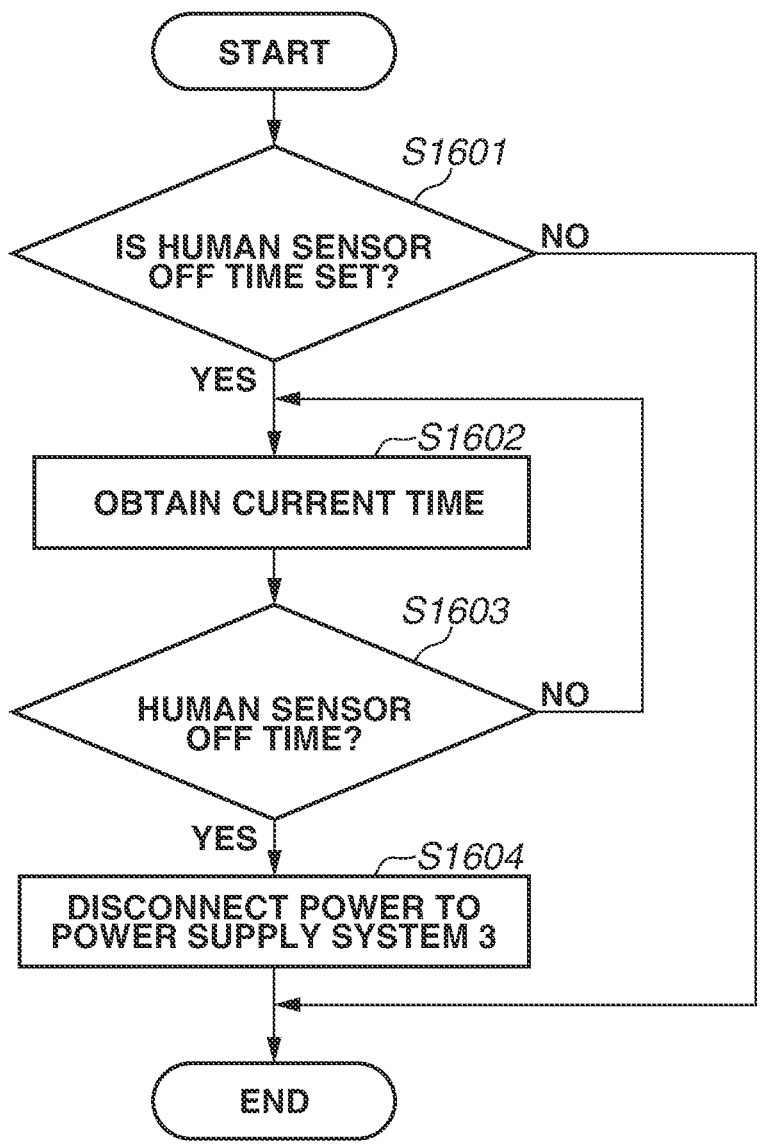
FIG. 16 is a flow chart illustrating a method for controlling the image forming apparatus.

FIG. 16 is a flow chart illustrating a method for controlling the image forming apparatus 100 according to the present exemplary embodiment. This example corresponds to an example of a time confirmation sequence of the human sensor off time function. Each step is realized by the CPU unit 317 executing a control program loaded into the memory unit 315.

First, in step S1601, the CPU unit 317 confirms the setting information 320 of the HDD unit 316 to determine whether the human sensor off time is set. If the CPU unit 317 determines that the human sensor off time is set (YES in step S1601), then in step S1602, the CPU unit 317 accesses the RTC unit 324 and obtains the current time.

If, on the other hand, the CPU unit 317 determines in step S1601 that the human sensor off time is not set (NO in step S1601), the time confirmation sequence of the human sensor off time function ends.

Next, in step S1603, the CPU unit 317 compares the obtained current time with the human sensor off time, thereby determining whether the times match each other. If the CPU unit 317 determines that the current time matches the human sensor off time (YES in step S1603), then in step S1604, the CPU unit 317 instructs the power supply control unit 312 to disconnect power to the power supply system 3. Then, if the power supply control unit 312 receives from the CPU unit 317 the instruction for disconnecting power to the power supply system 3, the power supply control unit 312 disconnects power to the human sensor unit power supply unit 321, and completes the shift to the human sensor power disconnection normal mode. If, on the other hand, the CPU unit 317 determines in step S1603 that the current time does not match the human sensor off time (NO in step S1603), the CPU unit 317 periodically accesses the RTC unit 324 and waits for the current time to match the human sensor off time.

Figure 17:
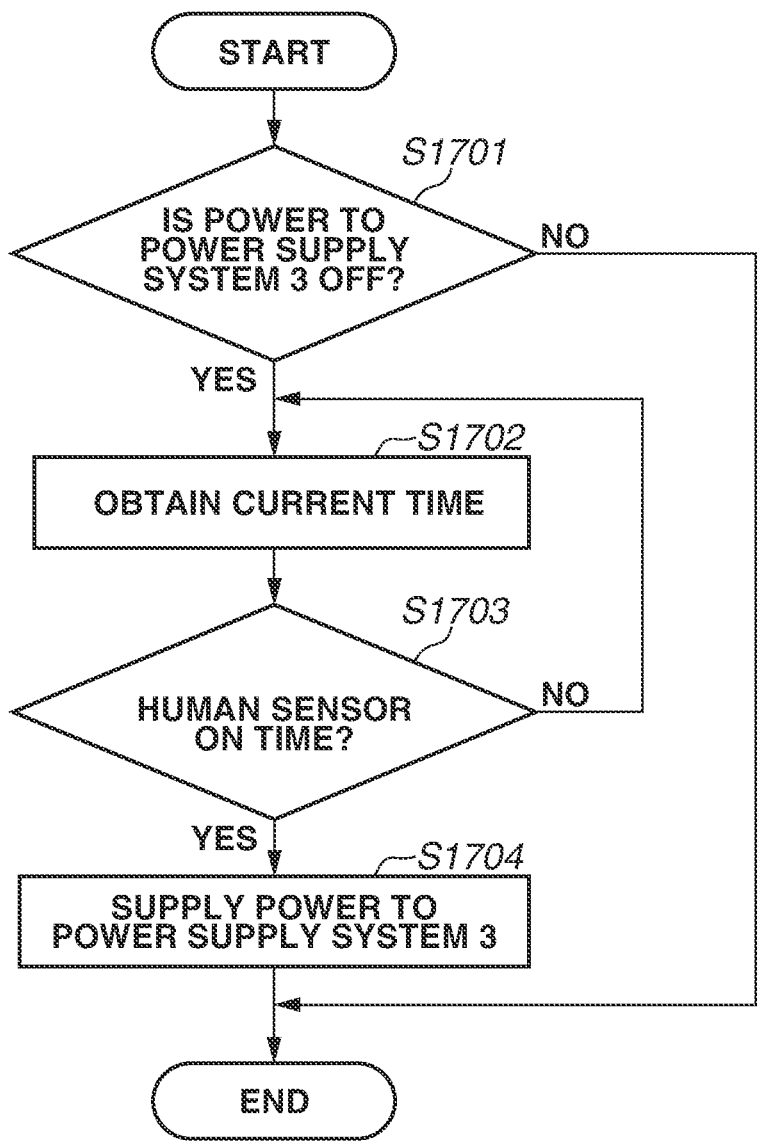
FIG. 17 is a flow chart illustrating a method for controlling the image forming apparatus.

FIG. 17 is a flow chart illustrating a method for controlling the image forming apparatus 100 according to the present exemplary embodiment. This example corresponds to an example of a time confirmation sequence of the human sensor on time. Each step is realized by the CPU unit 317 executing a control program loaded into the memory unit 315.

First, in step S1701, the CPU unit 317 confirms the state of the human sensor unit power supply unit 321 via the power supply control unit 312 to determine whether power to the power supply system 3 is disconnected by the human sensor off time function. If the CPU unit 317 determines that power to the power supply system 3 is disconnected (YES in step S1701), then in step S1702, the CPU unit 317 accesses the RTC unit 324 and obtains the current time.

If, on the other hand, the CPU unit 317 determines in step S1701 that power to the power supply system 3 is not disconnected (NO in step S1701), the time confirmation sequence of the human sensor on time ends.

Next, in step S1703, the CPU unit 317 compares the obtained current time with the human sensor on time of the setting information 320, thereby determining whether the current time matches the human sensor on time. If, as a result of comparing the current time with the human sensor on time of the setting information 320, the CPU unit 317 determines that the current time matches the human sensor on time (YES in step S1703), then in step S1704, the CPU unit 317 turns on the human sensor unit power supply unit 321, and starts the supply of power to the power supply system 3, which is the power supply for the human sensor unit 104.

If, on the other hand, the CPU unit 317 determines in step S1703 that the current time does not match the human sensor on time (NO in step S1703), the CPU unit 317 periodically accesses the RTC unit 324 and waits for the current time to match the human sensor on time.

According to the present exemplary embodiment, power to the human sensor unit 104 is disconnected, whereby it is possible to mask a return trigger from the human sensor 104. That is, it is possible to make a setting in such a manner that a sleep return operation resulting from erroneous detection of the human sensor is prevented only on dates and times when the image forming apparatus 100 is particularly less frequently used, such as Saturday and Sunday. Thus, it is possible to suppress an unnecessary shift to the normal mode.

According to each exemplary embodiment, in a case where the time at which the image forming apparatus 100 shifts from the normal mode to the sleep mode is set, power to the human sensor unit 104 is disconnected. Thus, it is possible to suppress an unnecessary shift to the normal mode at the time when the image forming apparatus 100 is less frequently used. Further, power to the human sensor unit 104 is disconnected, whereby it is possible to make the power consumption smaller than in the normal sleep mode.

Each step described in the above exemplary embodiments of the disclosure can be realized also by a processing apparatus (a CPU or a processor) of a personal computer (a computer) or the like executing software (a program) obtained via a network or various storage media.

The disclosure is not limited to the above exemplary embodiments. Various modifications (including the organic combinations of the exemplary embodiments) can be made based on the spirit of the disclosure, and such modifications are not excluded from the scope of the disclosure.

According to an exemplary embodiment of the disclosure, it is possible to stop power supply to a power supply system for detecting an object, for a predetermined time period during which an apparatus is in a power saving state.

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus, comprising:
   a human detection unit configured to detect a human;
   a reception unit configured to receive data from a network;
   a power control unit configured to, based on detecting the human by the human detection unit, change a power state of the information processing apparatus and to, based on reception of predetermined data by the reception unit, change the power state of the information processing apparatus;
   a setting unit configured to set information relating to time at which a function of the human detection unit is to be disabled; and
   a control unit configured to disable the function of the human detection unit at the time set by the setting unit, the function of the reception unit being not disabled at the time set by the setting unit.

2. The information processing apparatus according to claim 1, wherein, for at least one day of a week, the setting unit sets the information relating to time at which the function of the human detection unit is to be disabled.

3. The information processing apparatus according to claim 2, wherein, for each day of a week, the setting unit sets the information relating to time at which the function of the human detection unit is to be disabled.

4. The information processing apparatus according to claim 1, wherein the function of the human detection unit is disabled by stopping power supply to the human detection unit.

5. The information processing apparatus according to claim 1, wherein the setting unit further sets information relating to time at which the function of the human detection unit is to be enabled.

6. The information processing apparatus according to claim 5, wherein, for at least one day of a week, the setting unit sets the information relating to time at which the function of the human detection unit is to be enabled.

7. The information processing apparatus according to claim 6, wherein, for each day of a week, the setting unit sets the information relating to time at which the function of the human detection unit is to be enabled.

8. The information processing apparatus according to claim 5, wherein the control unit configured to enable the function of the human detection unit at time indicated the information relating to time set by the setting unit.

9. The information processing apparatus according to claim 1,
wherein the power state includes a plurality of power states including a first power state and a second power state in which less power is consumed than in the first power state, and
wherein, based on detecting the human by the human detection unit, the power control unit shifts the information processing apparatus from the second power state to the first power state.

10. An information processing apparatus, comprising:
a human sensor configured to sense a human;
a network processor configured to receive data from a network; and
a controller including at least one processor and at least one memory, configured to, based on sensing the human by the human sensor, change a power state of the information processing apparatus, configured to, based on reception of predetermined data by the network processor, change the power state of the information processing apparatus, configured to set information relating to time at which a function of the human sensor is to be disabled, and configured to disable the function of the human sensor at the set time, the function of the network processor being not disabled at the set time.

11. The information processing apparatus according to claim 10, wherein, for at least one day of a week, the controller sets the information relating to time at which the function of the human sensor is to be disabled.

12. The information processing apparatus according to claim 10, wherein the function of the human sensor is disabled by stopping power supply to the human sensor.

13. The information processing apparatus according to claim 10, wherein the controller further sets information relating to time at which the function of the human sensor is to be enabled.

14. The information processing apparatus according to claim 13, wherein, for at least one day of a week, the controller sets the information relating to time at which the function of the human sensor is to be enabled.

15. The information processing apparatus according to claim 14, wherein the controller enables the function of the human sensor at time indicated by the information.

16. The information processing apparatus according to claim 10,
wherein the power state includes a plurality of power states including a first power state and a second power state in which less power is consumed than in the first power state, and
wherein, based on detecting the human by the human sensor, the controller shifts the information processing apparatus from the second power state to the first power state.

* * * * *